(12) United States Patent
Lizotte

(10) Patent No.: US 7,075,724 B2
(45) Date of Patent: Jul. 11, 2006

(54) COMPENSATOR OPTICS TO IMPROVE THE STABILITY OF BEAM DELIVERY SYSTEMS THAT UTILIZE BEAM SHAPING TECHNOLOGY

(75) Inventor: Todd E. Lizotte, Manchester, NH (US)

(73) Assignee: Hitachi Via Mechanics, Ltd., Ebina (JP)

( * ) Notice: Subject to any disclaimer, the term of this patent is extended or adjusted under 35 U.S.C. 154(b) by 0 days.

(21) Appl. No.: 10/958,712

(22) Filed: Oct. 5, 2004

(65) Prior Publication Data

US 2005/0057809 A1    Mar. 17, 2005

Related U.S. Application Data

(63) Continuation-in-part of application No. 10/411,570, filed on Apr. 10, 2003, now Pat. No. 6,853,489.

(51) Int. Cl.
*G02B 27/10* (2006.01)

(52) U.S. Cl. .......................... 359/618; 359/16; 359/554

(58) Field of Classification Search .................. 359/16, 359/554, 618
See application file for complete search history.

(56) References Cited

U.S. PATENT DOCUMENTS

| | | | |
|---|---|---|---|
| 5,148,317 A | * | 9/1992 | Foresi .......................... 359/566 |
| 5,486,694 A | | 1/1996 | Harris |
| 6,002,520 A | * | 12/1999 | Hoch et al. .................. 359/565 |
| 6,075,650 A | | 6/2000 | Morris et al. |

OTHER PUBLICATIONS

Chien-Hung Liu, Wen-Yuh Jywe, and Chao-Kwai Chen; Development of a Diffraction-Type Optical Triangulation Sensor; Applied Optics, vol. 43, No. 30, pp. 5607-5613, Oct. 20, 2004, © 2004 Optical Society of America.

Gianluigi De Geronimo; Front-End ASICs for CZT and Si Multi-Element Detectors; Brookhaven National Laboratory, Upton, NY.

SIC—quadrant-photodiode JQC 4, http://www.lasercomponents.com (web page), Issue: 09/03/V2/HW/www/pdf/ifw/jqc4.pdf.

Position Sensitive Detectors: http://sales.hamamatsu.com/en/products/solid-state-division/position-sensitive-detectors.php, © Hamamatsu Corporation.

* cited by examiner

*Primary Examiner*—Hung Xuan Dang
*Assistant Examiner*—Joseph Martinez
(74) *Attorney, Agent, or Firm*—Davis & Bujold, P.L.L.C.

(57) ABSTRACT

A compensator/remapper and method for compensation and remapping of a laser beam for control and correction of laser pointing and thermal drift instability in a laser beam delivery system including a laser generating a laser beam and a plurality of optical elements for directing, shaping and focusing the laser beam along a beam path to a target. A compensator/remapper includes a compensator element and a remapper element. The compensator element receives an input laser beam having a range of input angles and lateral displacements and redirects components of the input laser beam into an aligned laser beam having evenly distributed and parallel components. The remapper element is illuminated by the aligned laser beam from the compensator element and remaps the components of the aligned laser beam into a shaped laser beam having a profile that is optimum for remapping into a flat top laser beam.

18 Claims, 6 Drawing Sheets

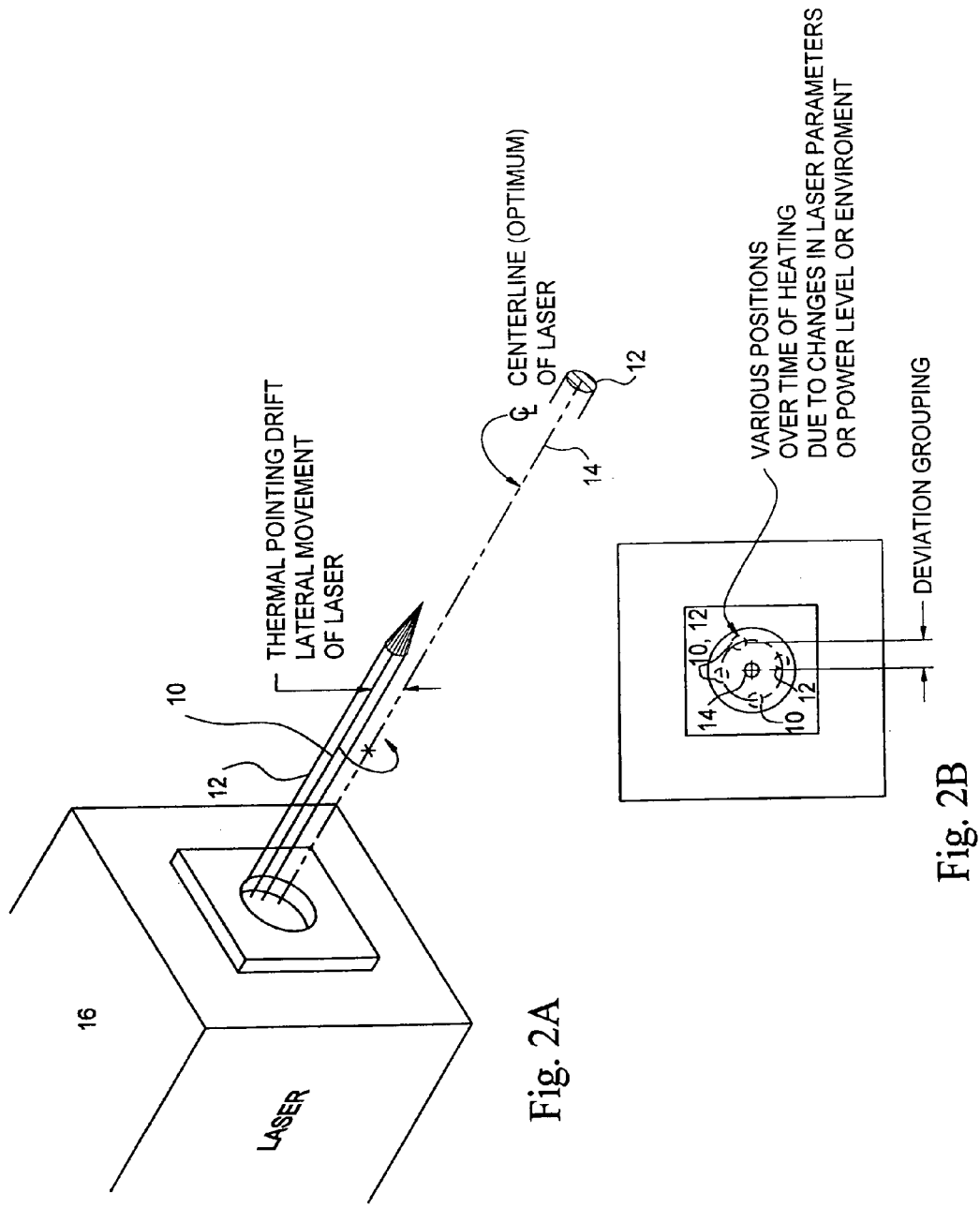

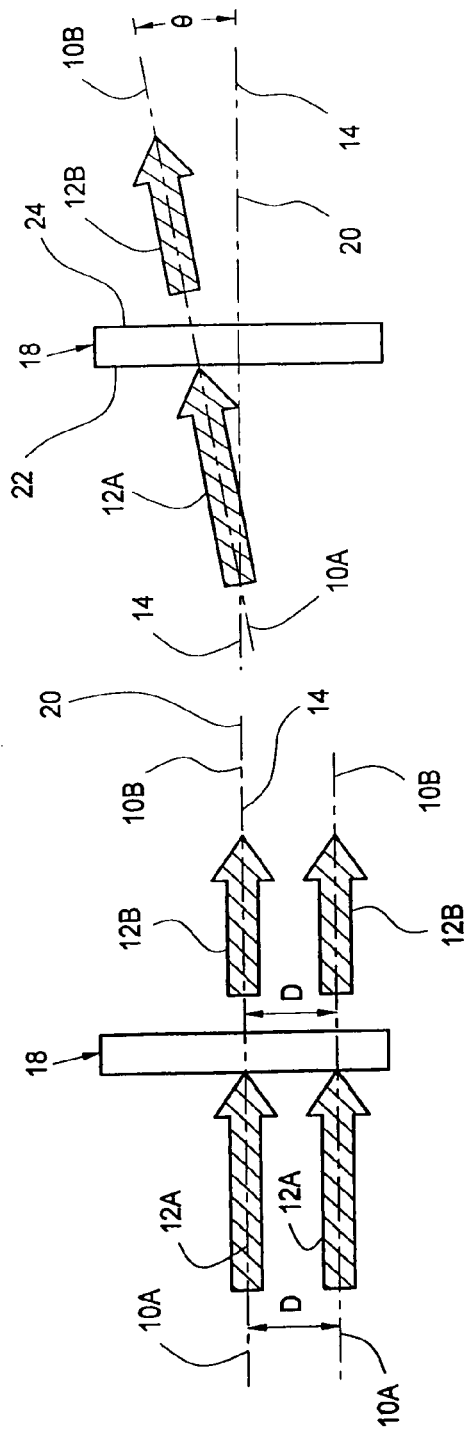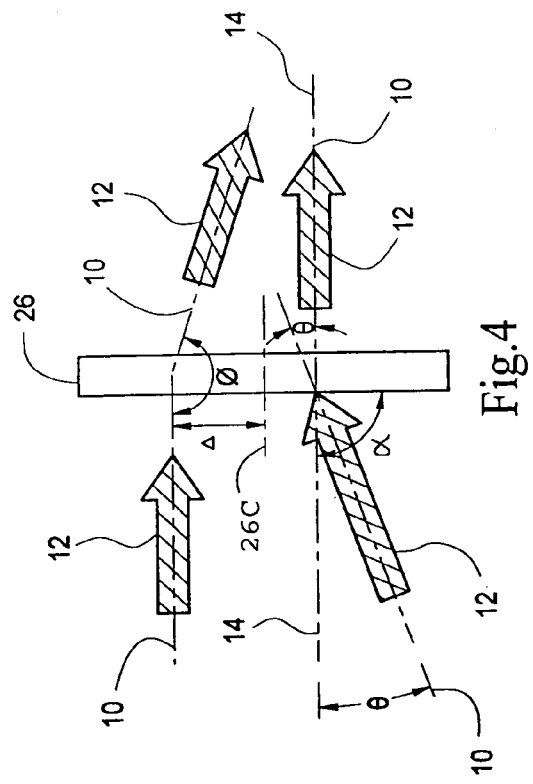

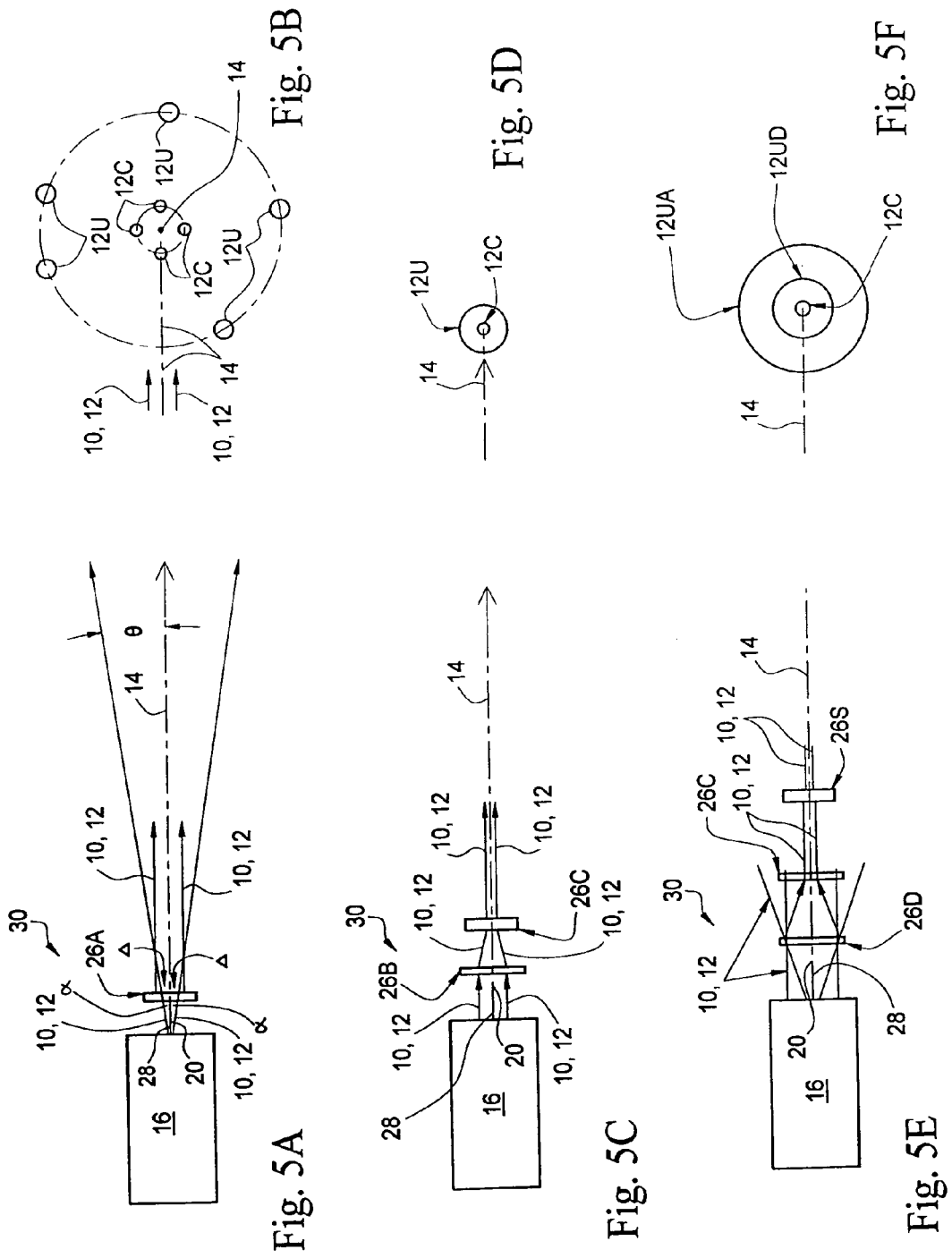

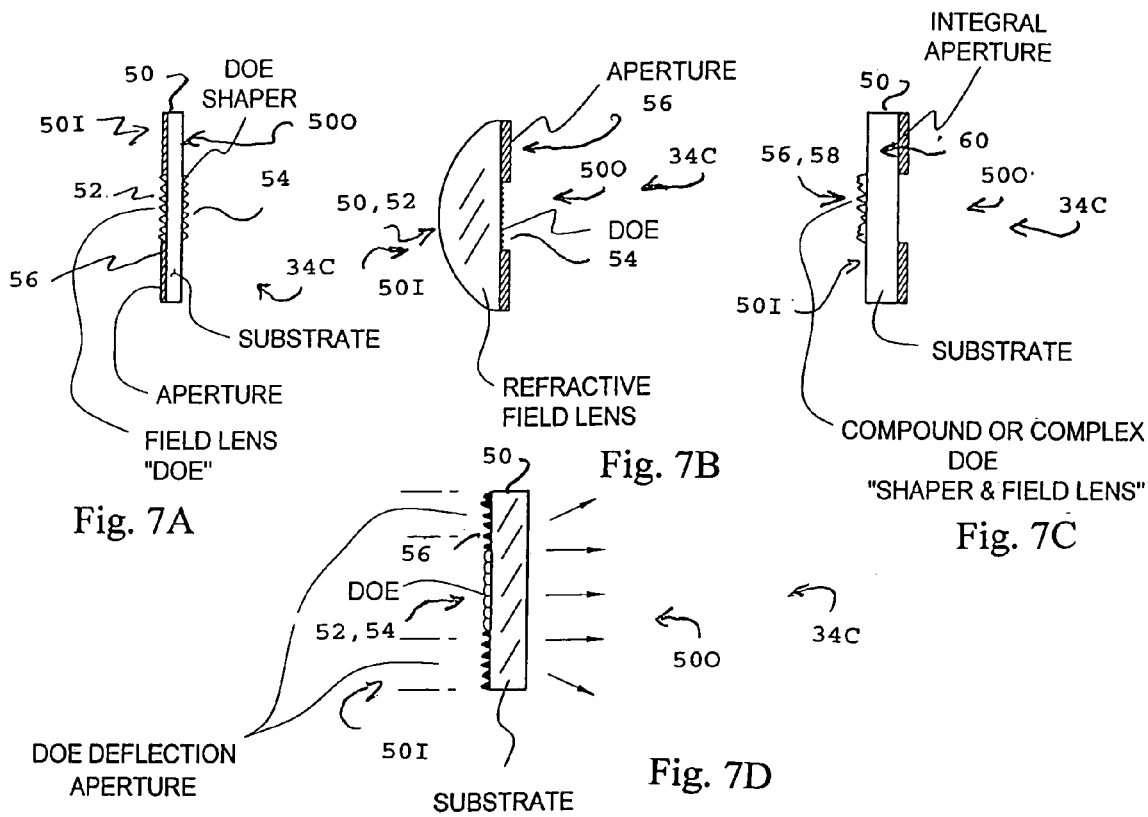
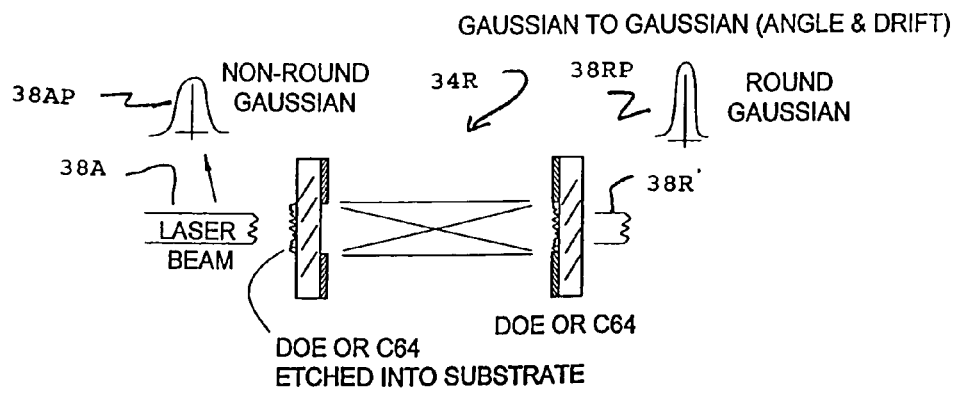

COMPENSATOR OPTICS TO IMPROVE THE STABILITY OF BEAM DELIVERY SYSTEMS THAT UTILIZE BEAM SHAPING TECHNOLOGY

CROSS REFERENCE TO RELATED APPLICATIONS

The present invention is related to and is a continuation-in-part of presently pending U.S. patent application Ser. No. 10/411,570 filed Apr. 10, 2003 now U.S. Pat. No. 6,853,489 by Todd E. Lizotte for CORRECTION OF ANGULAR DEVIATION AND RADIAL DRIFT OF LASER BEAMS.

FIELD OF THE INVENTION

The present invention relates to the control and correction of laser pointing and thermal drift instability in laser beam delivery systems and, in particular, to compensator optics using beam shaping for control and correction of laser pointing and thermal drift instabilities.

BACKGROUND OF THE INVENTION

Focused and directed laser beams are commonly used for a variety of processes, such as drilling of blind, through and micro-vias, laser imaging, dicing of substrates and modification or customization of integrated circuits, drilling, cutting, and selective material removal and other complex machining and micro-machining operations involving materials such as metals, polymers, integrated circuits, substrates, ceramics and other materials. Such processes have become very complex, often involving the concurrent or sequential of use of single or multiple lasers or multiple types of lasers, such as visible, infra-red (IR) and ultraviolet (UV) lasers, in concurrent or sequential operations. In generally all such laser processes, however, the general object of a laser system is to controllably and reliably direct, focus and concentrate the energy of one or more laser beans to converge each beam at a desired spot or to image an apertured area of a laser beam onto the surface of an object.

A number recurring problems of conventional laser systems of the prior art, however, directly affect the reliable and controllable "pointing" of a laser beam to a desired location. The first, which is illustrated in FIGS. 1A and 1B, is often referred to as "beam wobble" or "pointing instability" and is the radial deviation of the Beam Axis 10 a Laser Beam 12 from an Optimum Centerline 14 by a Deviation Angle θ and is often related to variations in the pulse energy of the laser beam, which is often referred to as "pumping jitter". Pointing instability is essentially inherent in both the properties of a Laser 16 itself and in the normal operations of a Laser 16, such as "pumping jitter".

A second problem of the prior art is illustrated in FIGS. 2A and 2B and is often referred to as "thermal drift", which again causes the Beam Axis 10 of a Laser Beam 12 to drift from an Optimum Centerline 14. Thermal drift is generally regarded as due to changes in the parameters of the Laser 16 due to changes in the laser duty cycle, heating during operation, changes in power levels of the Laser 16. It should be noted that, unlike "pointing instability" which results in an angular deviation of the Beam Axis 10 from the Optimum Centerline 14, "thermal drift" results in a linear radial drift of the Beam Axis 10 with respect to the Optimum Centerline 14. That is, the Beam Axis 10 of a Laser Beam 12 remains parallel to the axis of Optimum Centerline 14, but drifts radially away from Optimum Centerline 14.

Yet a third problem of the prior art is that of beam mode changes over time, which results in "hot spots", or distortions of the beam profile. If the profile of the beam is non-uniform or does not have an optimum Gaussian profile, the shape of the profile cannot be subsequently shaped into the preferred "flat top" profile, which will adversely effect the quality of the processes performed by the laser system, such as micro-machining or the drilling of microvias. This problem is further compounded, of course, by pointing instabilities and thermal drift.

Effectively all lasers used for micro-machining, such as microvia drilling, exhibit pointing instabiity, thermal drift and profile distortion, and there have been many attempts to correct or at least control these problems. For example, laser systems of the prior art have attempted to correct the effects of "pointing instability" and "thermal drift" by the use of actively controlled servo-mirrors, which are controlled to redirect a laser beam so as to correct for the "pointing instability" and "thermal drift". Such methods, however, require detecting and comparing the actual path of a beam due to pointing instability or thermal instability with the desired optimum path for the beam and controlling the servo-mirrors so as to direct the beam into the desired path. Not only are such methods complex and expensive, but they have an inherent time delay in detecting and correcting the effects of pointing instability or thermal drift, and introduce errors of their own due to mechanical and control system tolerances and have thereby not provided completely satisfactory solutions to these problems.

Other approaches of the prior art to these problems have used optical elements in the laser beam path to correct for pointing instabilities and thermal drift and to shape the beam into the optimun Gaussion and flat-top profiles for micro-machining, such as the drilling of microvias. A recurring problem, however, is that when the an optical beam shaping system is illuminated poorly, that is, either at an incident angle or with a laterally displaced beam, such as may result from pointing instabilities, thermal drift or hot spots, the optical beam shaping elements are not able to shape the laser beam into the desired profile. It will be apparent, however, that pointing instabilities and thermal drift will, in themselves, result in the beam reaching the beam shaping elements at an incident angle or with a lateral displacement, thereby resulting poor illumination of the beam shaping elements and problems in appropriate shaping of the beam profiles.

These problems arising with the use of optical elements to correct or compensate for pointing instability and thermal drift are illustrated in FIGS. 3A and 3B with respect to the use of holographic optical elements (HOEs) and standard symmetric holographic optical element (SSHOEs) employed as beam shaping elements. FIG. 3A, for example, illustrates the results of radial displacement due to thermal drift effects in the case of a Holographic Optical Element (HOE) and, in particular, with respect to a Standard Symmetric Holographic Optical Element (SSHOE) 18, or an equivalent lens. Because the SSHOE 18 is symmetric, a Laser Beam 1 2A that enters the SSHOE 18 along a Beam Axis 10A that is parallel to the HOE Axis 20 will exit the SSHOE 18 as Laser Beam 12B on Beam Axis 10B wherein Beam Axis 10B is coaxial with and a linear continuation of Beam Axis 10B. More specifically, a Laser Beam 12A entering the SSHOE 18 along a Beam Axis 10A that is parallel to but radially displaced by a distance D from the HOE Axis 20 will exit the SSHOE 18 along the same Beam Axis 10A, indicated as Beam Axis 10B, and will remain radially displaced with respect to the HOE Axis 20 by a distance D. As such, a SSHOE 18 or equivalent symmetric lens will not radially redirect the Beam Axis 10 of an entering Laser Beam 12 with respect to the HOE Axis 20 of the SSHOE 18, and thereby cannot correct for or control thermal drift effects.

Referring to FIG. 3B, a Laser Beam 12A effected by "pointing instability" will enter an Entry Face 22 of the SSHOE 18 along Beam Axis 10A having an angular deviation $\theta$ with respect to the HOE Axis 20, that is, will not be parallel with the HOE Axis 20. Because of the symmetry of a SSHOE 18 or equivalent symmetric lens, however, the Laser Beam 12B will exit the Exit Face 24 of the SSHOE 18 along a Beam Axis 10B that is the continuation of the Beam Axis 10A along which the Laser Beam 12A entered the SSHOE 18. As in the case of thermal drift, therefore, conventional SSHOEs 18 and similar symmetric lenses cannot correct for or control pointing instability and the resulting angular deviation of the Beam Axis 10.

The present invention provides a solution to these and related problems of the prior art.

SUMMARY OF THE INVENTION

The present invention is directed to a compensator/remapper and method for compensation and remapping of a laser beam for control and correction of laser pointing and thermal drift instability in a laser beam delivery system including a laser generating a laser beam and a plurality of optical elements for directing, shaping and focusing the laser beam along a beam path to a target.

According to the present invention, a compensator/remapper includes a compensator element and a remapper element. The compensator element receives an input laser beam having a range of input angles and lateral displacements and redirects components of the input laser beam into an aligned laser beam having evenly distributed and parallel components. The remapper element is illuminated by the aligned laser beam from the compensator element and remaps the components of the aligned laser beam into a shaped laser beam having a profile that is optimum for remapping into a flat top laser beam.

In various embodiments of the invention, the compensator element may be a computer generated hologrammic lens encoded over an entire surface of the hologrammic lens and the remapper element may be one of a computer generated holographic radially symmetric diffractive optical element (RSDOE) and a computer generated holographic non-symmetric diffractive optical element (NSDOE).

For example, the compensator element can include a substrate, a field lens located on an input side of the substrate, a diffractive optical element shaper located on an output side of the substrate, and an aperture defined by the field lens. The compensator element may also include a compensator element formed of a refractive lens element and a computer generated holographic diffractive optical element shaper located on an output side of the compensator element wherein the refractive lens forms a substrate for the diffractive optical element diffractive optical element shaper and the shaper forms an aperture. In yet another embodiment, the compensator element may include a substrate, a single diffractive optical element located on an input side of the substrate and forming an integrated field lens element and shaper element, and an aperture formed on an output side of the substrate.

In the present preferred embodiments of the invention, the aligned laser beam output of the compensator element has a non-round Gaussian profile and the shaped laser beam output of the remapper element has a round Gaussian profile.

BRIEF DESCRIPTION OF THE DRAWING(S)

The invention will now be described, by way of example, with reference to the accompanying drawings in which:

FIGS. 2A and 2B are illustrative diagrams of radial drift of a laser beam due to thermal drift;

FIGS. 3A and 3B are illustrative diagrams of radial displacement and angular deviation of laser beams;

FIG. 4 is an illustrative diagram of the method of the present invention for correcting angular deviation or radial displacement;

FIGS. 5A, 5B, 5C, 5D, 5E and 5F are illustrative diagrams of optical elements and combinations of optical elements for correcting angular deviation and radial drift of laser beams;

FIGS. 7A, 7B, 7C, 7D and 7E are illustrative diagrams of exemplary compensators and remappers.

DETAILED DESCRIPTION OF THE INVENTION

A. General Description

Figure 1A:
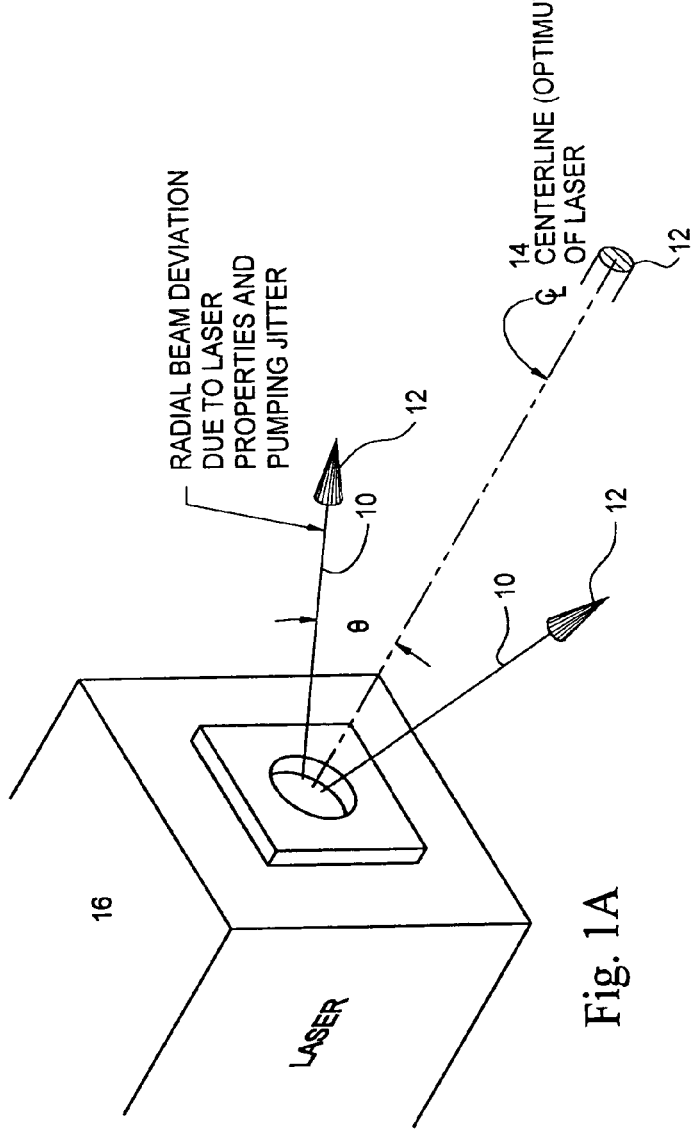
FIGS. 1A and 1B are illustrative diagrams of angular deviation of a laser beam due to pointing instability.
Figure 1B:
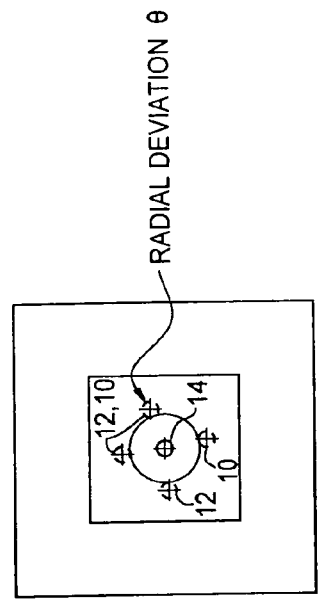

According to the present invention, and as illustrated generally in FIGS. 4 and 5A through 5F, either or both of radial displacement due to thermal drift and angular deviation due to pointing instability may be corrected by means of a Non-Symmetric Element (NSE) 26 as illustrated in FIG. 4. As illustrated therein, an NSE 26 may be, for example, a Non-Symmetric Hologram Optical Element (NSHOE) or an equivalent optical element, such as a non-symmetric lens or a non-symmetric refraction element or a non-symmetric diffraction element. As indicated, an NSE 26 differs from a SSHOE 18 or equivalent symmetric element in that the path of the Beam Axis 10 of a Laser Beam 12 traversing the NSE 26 is refracted, or turned, through a Correction Angle $\phi$ during the passage of the Laser Beam 12 through the NSE 26. As will be discussed further in the following, in one embodiment of a NSE 26 the angle $\phi$ increases with increasing radial displacement $\Delta$ of the incident Beam Axis 10 from the Centerline Axis 26C of the NSE 26. In a second embodiment of a NSE 26, the Correction Angle $\phi$ increases with an decreasing angle of incidence $\alpha$ of the Beam Axis 10 of the incident Laser Beam 12 with respect to the plane surface of the NSE 26.

Examples of embodiments of Drift/Deviation Correction Elements 30 for correcting either or both of radial displacement due to thermal drift and angular deviation due to pointing instability are illustrated in FIGS. 5A, 5B and 5C.

FIG. 5A illustrates an embodiment of a Drift/Deviation Correction Element 30 for the correction of angular deviation of a Laser Beam 12 due to pointing instability. As shown, in this instance the Drift/Deviation Correction Element 30 is comprised of a single NSE 26, 26A, 26B, 26C, 26D or 26S such as a Non-Symmetric Hologram Optical Element (NSHOE) or equivalent non-symmetric lens.

First considering the geometric aspects of angular deviation due to pointing instability as illustrated in FIG. 5A, a Laser Beam 12 having angular deviation resulting from pointing instability may be considered as emitting from a point, that is, from Laser 16, such that the Beam Axis 10 of each Laser Beam 12 radiates outwards from that point at an angular deviation θ that is dependent upon the degree of wobble and until the Laser Beam 12 strikes the plane of the NSE 26. A consideration of the geometry of the elements shown in FIG. 5A will show that the angle of incidence a between the Beam Axis 10 and the plane of the NSE 26A will decrease, in a reciprocal relationship, as the angular deviation θ increases. It will also be apparent that the radial displacement Δ between the Centerline Axis 26C of the NSE 26A and the point at which the Beam Axis 10 is incident upon the NSE 26A increases as the angular deviation θ increases. Stated another way, an angular deviation θ will result in both an inversely proportional angle of incidence a with the NSE 26A and a proportionate radial displacement Δ from the Centerline Axis 26C of the NSE 26A.

It will be apparent that the correction of angular deviation due to pointing instability, requires that the Beam Axes 10 of the Laser Beams 12 be redirected, that is, turned or refracted, through an Correction Angle φ to orient the Beam Axes 10 in the desired manner. In this regard, and for example, the Correction Angle φ may be designed so that the Beam Axes 10 are parallel to HOE Axis 20 upon exiting the NSE 26A. In other instances, the Correction Angle φ may be designed to direct the Laser Beams 12 onto a selected point or area at a predetermined distance from the NSE 26A, such as at the entry face of a second NSE (not shown).

In either instance, and as may be seen from the above discussion of angular deviation geometry, the magnitude of the Correction Angle φ must therefore increase with either increasing radial displacement Δ or with decreasing angle of incidence α. In a first embodiment of an Angular Correction NSE 26A, therefore, the Angular Correction NSE 26A, which may be, for example, a NSHOE or equivalent non-symmetric lens, is designed such that the Correction Angle φ increases proportionally to the radial distance from the central axis of the Angular Correction NSE 26A. As described, therefore, the greater the angular deviation θ of a Beam Axis 10 the greater the radial displacement Δ of the Beam Axis 10 from the central axis of the Angular Correction NSE 26A and the greater the Correction Angle φ.

In a second embodiment of an Angular Correction NSE 26A, the Angular Correction NSE 26A may be designed such that the Correction Angle φ increases with a decreasing angle of incidence α, that is, with an increasing angular deviation θ of the Beam Axis 10. As may be seen, however, the two embodiments of an Angular Correction NSE 26A are equivalent because the relationship between angular deviation θ, angle of incidence a and radial displacement Δ.

As illustrated in FIG. 5A, therefore, the Angular Correction NSE 26A of the Drift/Deviation Correction Element 30 will correct an angular deviation θ by turning, or refracting, the Laser Beam 12 through a Correction Angle φ that is proportionate to the angular deviation θ. The result will therefore be that any Laser Beam 12 having a Beam Axis 10 that is not parallel to the HOE Axis 20 will be turned through a Correction Angle φ so that the Beam Axis 10 will be parallel to the HOE Axis 20 or so that the Beam Axis 10 is directed to a selected focal point or area.

The result of the operation of an Angular Correction NSE 26A is illustrated in FIG. 5B, which is an end view of a Laser 16 showing a possible distribution of Corrected Laser Beams 12C about the Optimum Centerline 14 in comparison with a possible distribution of the Uncorrected Laser Beams 12U.

FIG. 5C, in turn, illustrates an embodiment of a Drift/Deviation Correction Element 30 for the correction of radial displacement of a Laser Beam 12 due to thermal drift. As discussed previously, thermal drift or similar causes of radial displacement result in a radial displacement of a Beam Axis 10 from a desired Optimum Centerline 14, rather than an angular deviation from the Optimum Centerline 14. For this reason, the radial displacement, that is, thermal drift, results in a Beam Axis 10 having an angle of incidence α of approximately 90° with respect to a NSE 26 and correction of radial displacement Δ will be a function of radial displacement Δ rather than of angle of incidence α.

As shown, in this instance the Drift/Deviation Correction Element 30 may be comprised of a Displacement Correction NSE 26B followed by a Collimating NSE 26C, each of which may be, for example, Non-Symmetric Hologram Optical Elements or equivalent non-symmetric lenses.

In this embodiment, and as discussed above, the Correction Angle φ of Displacement Correction NSE 26B increases radially and proportionately to the radial displacement Δ between Centerline Axis 26C of Displacement Correction NSE 26B and the point at which the Beam Axis 10 of a Laser Beam 12 is incident upon the plane of the Displacement Correction NSE 26B. The effect of Drift Correction NSE 26B is therefore to refract or turn a Laser Beam 12 through a Correction Angle φ that is proportionate to the radial displacement Δ of the Beam Axis 10, that is, by an angle proportionate to the thermal drift of the Laser Beam 12. Because the displacement of Beam Axes 10 of Laser Beams 12 resulting from thermal drift is radial, and the Beam Axis 10 of a Laser Beam 12 is thereby approximately parallel to the Optimum Centerline 14, the Beam Axes 10 are usually perpendicular to the entering face of the Displacement Correction NSE 26B. As such, the Correction Angle φ imposed by the Displacement Correction NSE 26B will compress, that is, direct or focus, the Beam Axes 10 onto a point or small area at a fixed distance from the Displacement Correction NSE 26B. As illustrated in FIG. 5C, the focus point of Displacement Correction NSE 26B is near or at the entry face of the second element of Drift/Deviation Correction Element 30, which is shown as Collimating NSE 26C.

Collimating NSE 26C is, in some respects, analogous to an inverse transform of an Angular Correction NSE 26A. That is, and as indicated, Laser Beams 12 enter Collimating NSE 26C from Correction NSE 26B such that their Beam Axes 10 generally are at an angle α with respect to the HOE Axis 20 of Collimating NSE 26C, that is, at an angle analogous to an angular deviation θ. As illustrated, Collimating NSE 26C redirects or turns each incoming Laser Beam 12 through a Correction Angle φ that is inversely proportionate to the angle of incidence α, so that the Beam Axes of the Laser Beams exiting Collimating NSE 26C are parallel.

A Drift/Deviation Correction Element 30 comprised of a Displacement Correction NSE 26B followed by a Collimating NSE 26C may thereby correct radial displacement due to thermal drift by first redirecting the Laser Beams 12 to reduce the radial displacement of each Laser Beam 12, by focusing or directing the Laser Beams 12 into a defined area at a defined distance, and then by correcting the relative angles of the Beam Axes 10 to be parallel to the desired Optimum Centerline 14.

The operation of such a Drift/Deviation Correction Element 30 is illustrated in FIG. 5D, which illustrates a possible distribution of Corrected Laser Beams 12C about the Optimum Centerline 14 in comparison with Uncorrected Laser Beams 12U.

Next considering the case illustrated in FIG. 5E, it will be apparent that angular deviation due to pointing instability and radial displacement due to thermal drift will rarely occur in isolation and that it will be common for both effects to be present in a given situation. As such, the Beam Axes 12 many if not all Laser Beams 12 will show both angular deviation and radial displacement and the radial distance from the Centerline Axis 26C of the NSE 26D at which a given Laser Beam 12 will impinge upon a NSE 26D may be due to radial displacement, or due to angular deviation or due to both in varying degrees.

As such, a two element Drift/Deviation Correction Element 30 may be constructed using, for example, a Deviation Correction NSE 26A followed by a Displacement Correction NSE 26B. Each would function as described above so that the combination would first correct the angular deviation of the Laser Beams 12, redirecting each Laser Beam 12 through a Correction Angle φ dependent upon the angular deviation to output Laser Beams 12 having parallel Beam Axes 10. The first stage would therefore, and in effect, change angular deviation into radial displacement, and radial displacement into angular displacement, so that the output Laser Beams 12 would demonstrate only radial displacement. The second stage would then correct radial displacement, as discussed with regard to FIG. 5C, to provide the final output Laser Beams 12.

Another embodiment of a Drift/Deviation Correction Element 30 is illustrated in FIG. 5E wherein the characteristics of both an Angular Correction NSE 26A and a Displacement Correction NSE 26B are combined in a single Angular/Displacement Correction NSE 26D, which may be comprised, for example, of a NSHOE. In this instance, the Correction Angle φ is a function of both the radial displacement of an impinging Laser Beam 12 from the HOE Axis 20 and the angle of incidence α of a Laser Beam 12 on the Angular/Displacement Correction NSE 26D, so that the single Angular/Displacement Correction NSE 26D performs the function of both an Angular Correction NSE 26A and a Displacement Correction NSE 26B.

In either embodiment, the output of the Drift/Deviation Correction Element 30 is passed through a Collimating NSE 26C to form a collimated Laser Beam 12, and then through a Shaper Element 26S. It will be understood, in this regard, that Collimating NSE 26C and Shaper Element 26S may be arranged in any order, and that these elements may be comprised of, for example, NSHOEs, HOEs, aspheric optical elements, or any other elements that will perform the required functions.

The results of the embodiment illustrated in FIG. 5E are illustrated in FIG. 5F for a possible distribution of Corrected Laser Beams 12C about an Optimum Centerline 14 in comparison with Drift Uncorrected Laser Beams 12DU and Angular Uncorrected Laser Beams 12AU.

B. Detailed Description of the Present Invention

Having described the general method and apparatus of the present invention for correcting or compensating for the angular deviation and radial drift of laser beams, the following will next describe certain presently preferred embodiments of the general principles and apparatus described above.

Figure 6A:
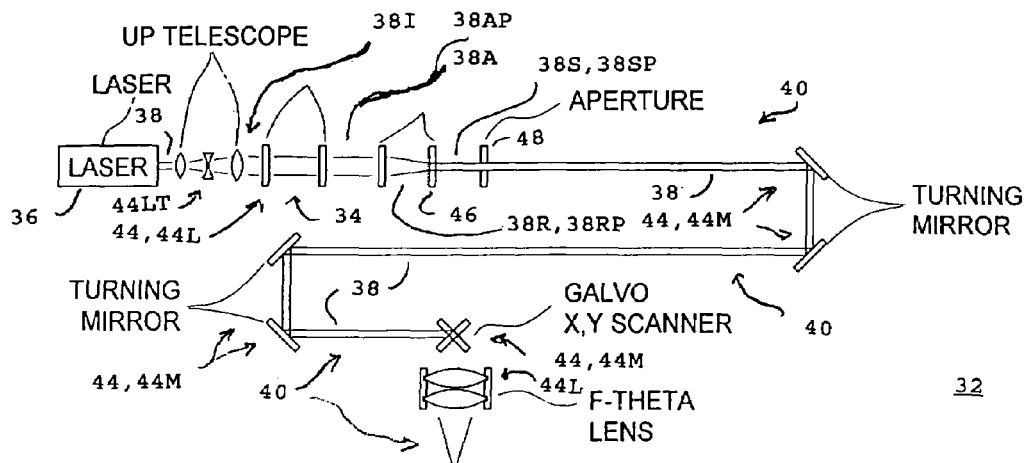
FIGS. 6A, 6B and 6C are illustrative diagrams of systems in which the present invention is implemented.
Figure 6B:
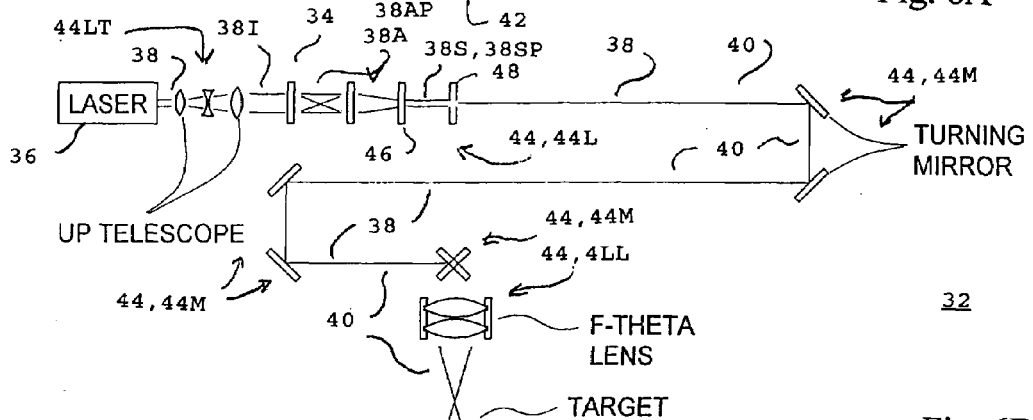
Figure 6C:
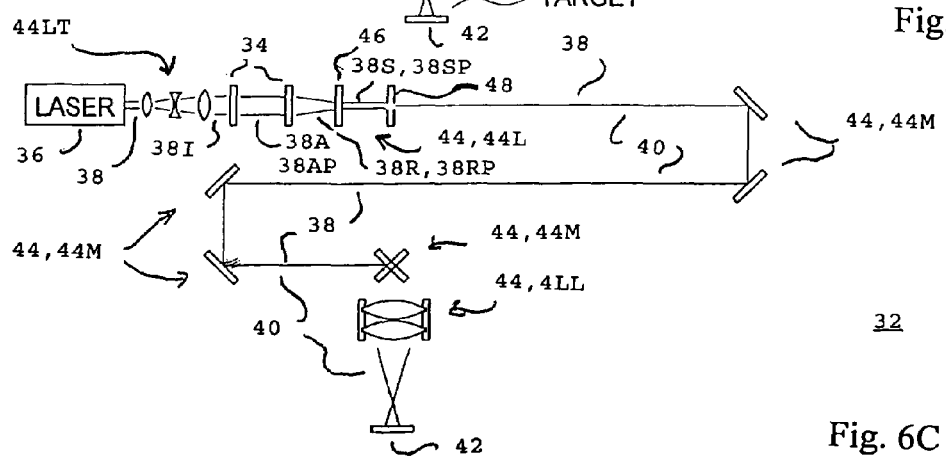

Referring to FIGS. 6A, 6B and 6C, therein are illustrated embodiments of exemplary Systems 32A, 32B and 32C, hereafter referred to generally as a System or Systems 32, that each include a Compensator/Remapper 34 of the present invention. As will be described, a Compensator/Remapper 34 accepts an input beam over a range of input angles and lateral displacements and "remaps" the input profile of the input beam to provide an output beam having an output profile that is optimum for a following element which shapes the input beam from Compensator/Remapper 34 into a final output beam.

As illustrated in FIGS. 6A, 6B and 6C, a System 32 includes a Laser 36 generating a laser beam, identified generally as Beam 38, that is transmitted along a Beam Path 40 to one or more Targets 42. It should be noted that in certain systems the Beam 38 may be divided into a group of beamlets that may be steerable individually or as a group and that for purposes of the present descriptions will be collectively referred to as Beam 38. As shown, Beam Path 40 typically includes a number of Optical Elements 44, such as Lenses 44L and Mirrors 44M, that form, focus and shape Beam 38 along Beam Path 40.

The Optical Elements 44 of typical Laser System 32 may include, for example, an Up Telescope Assembly 44LT, which is an assembly of multiple Lenses 44L to initially shape and focus the Beam 38 emitted by Laser 36. Up Telescope Assembly 44LT may be followed by a Compensator/Remapper 34 which, as described in further detail below, may be comprised of one or more elements to remap an Input Beam 38I into the Compensator/Remapper 34 into an Remapped Beam 38R having a Remapped Profile 38RP that is selected as optimum for a following Shaper 46 to remap into a final Shaped Beam 38S having a Shaped Profile 38SP. In a presently preferred embodiment in a System 32 for drilling microvias, for example, Remapped Profile 38RP may be a round Gaussian profile and Shaped Profile 38SP will typically be a "flat top" profile, that is, a profile having a generally even energy distribution across the diameter of the Beam 38. A following Aperture 48 then further shapes the Beam 38S and, in particular, shapes the cross sectional image of the Beam 38S.

Lastly, and as also shown, Beam Path 38 further includes fixed Mirrors 42M and galvonometer controlled movable Mirrors 42M for redirecting and steering Beam 30 or Beamlets 30B, and will typically include a final Lens 42L such as a F-Theta lens for final shaping and focus of the Beam 30 or Beamlets 30B.

B. Compensator/Remapper 34

As described, and according to the present invention, Beam Path 40 includes a Compensator/Remapper 34 which accepts an Input Beam 38I having an Input Profile 38IP and "remaps" the profile of Input Beam 38I to provide an Remapped Beam 38R having an Remapped Profile 38RP that is optimum for a following Shaper 46 to remap into a final profile. In a presently preferred embodiment of the invention, a Compensator/Remapper 34 includes a Compensator 34C element that accepts Input Beam 38I, which will typically have a beam or beam components having a range of input angles and lateral displacements, and generates an Aligned Beam 38A output having beam components that are essentially evenly distributed and parallel and that has, for example, a non-round profile so as to evenly illuminate a following Remapper 34R element. Remapper 34R then remaps the output Aligned Beam 30A into the Remapped Beam 38R having an optimum Remapped Profile 38RP, such as a round Gaussian profile, that may then be remapped by Shaper 46 into a Shaped Beam 38S having, for example, a flat top profile.

C. Compensator 34C

In a presently preferred embodiment of a Compensator/Remapper 34, the Compensator 34C element is a computer generated hologram element, or "CGH", that can be illuminated by an Input Beam 38I at different input angles and with different lateral displacements, and will form that Input Beam 30I into an evenly distributed, parallel Aligned Beam 38A with which to illuminate Remapper 34R. In a present embodiment, for example, Input Beam 38I to Compensator 34C may have essentially any profile and Aligned Profile 38AP may be, for example, a non-round profile.

In a presently preferred embodiment of the invention, Compensator 34C is implemented as a hologrammic lens that is encoded over its entire surface. The encoded surface of Compensator 34C or any part thereof thereby includes all of the information necessary to remap Input Beam 38I into an Aligned Beam 38A and Compensator 34C will do so regardless of where on its surface Compensator 34C is illuminated by the Input Beam 38I. It should be noted, however, that a Compensator 34C may also be implemented in other forms, as will be discussed in the following.

Considering the implementation and operation of a Compensator 34C in further detail, discussed and illustrated above with reference to FIGS. 5A–5F, either or both of radial displacement due to thermal drift and angular deviation due to pointing instability may be corrected by means of a Compensator 34C that embodies and implements a Non-Symmetric Element (NSE) 26. As described, an NSE 26 may be, for example, a Non-Symmetric Hologram Optical Element (NSHOE), that is, a type of CGH element, or an equivalent optical element such as a non-symmetric lens or a non-symmetric refraction element or a non-symmetric diffraction element. As discussed, an NSE 26 differs from a SSHOE 18 or equivalent symmetric element in that the path of the Beam Axis 10 of a Laser Beam 12 traversing the NSE 26 is refracted, or turned, through a Correction Angle φ during the passage of the Laser Beam 12 through the NSE 26. For example, and as discussed above, in one embodiment of an NSE 26, the angle φ increases with increasing radial displacement Δ of the incident Beam Axis 10 from the Centerline Axis 26C of the NSE 26. In another embodiment of a NSE 26, the Correction Angle φ increases with an decreasing angle of incidence α of the Beam Axis 10 of the incident Laser Beam 12 with respect to the plane surface of the NSE 26.

Referring now to FIGS. 7A, 7B, 7C and 7D, therein are illustrated presently preferred alternate embodiments of a Compensator 34C element or elements for performing lateral drift and angular error correction and compensation. As will be understood by those of ordinary skills in the arts, a Compensator 34C element or elements may be implemented using the using the principles, structures and elements described herein above with respect to various forms of single and multiple NSEs 26. A Compensator 34C element or elements may be embodied as, for example, multi-function diffractive optical elements (MFDOEs), integrated multi-function diffractive optical elements (IMFDOEs), multi-function holographic optical elements (MFCGH) or multi-function fresnel prisms (MFFZPs) or other CGHs or optical assemblies capable of the desired functions.

For example, the Compensator 34C illustrated in FIG. 7A is comprised of a Substrate 50 bearing a Field Lens 52 on Input Side 50I and a DOE Shaper 54 element on Output Side 50O wherein Field Lens 52 and DOE Shaper 54 are comprised of holographic elements and wherein Field Lens 52 also defines an Aperture 56. Field Lens 52 and DOE Shaper 54 are typically CGH elements that are designed, as discussed above, to perform the lateral drift and angular error correction and compensation functions while Aperture 56 shapes the beam passing through the Compensator 34C and masks out portions of the Input Beam 30I that are outside the ranges of Field Lens 52 and DOE Shaper 54.

FIG. 7B, in turn, illustrates a Compensator 34C that includes an Aperture 56 but wherein DOE Shaper 54 is implemented as a CGH element on the output face of a refractive lens element forming Field Lens 52. As shown, this embodiment does not require a separate Substrate 50 as the refractive lens forming Field Lens 52 performs this function.

FIG. 7C illustrates an embodiment of a Compensator 34C employing a Substrate 50 and wherein Field Lens 52 and Shaper 54 are integrated into a single compound, or complex, holographic DOE lens element mounted on Input Side 52I of Substrate 54. This embodiment also includes an Aperture 56, which is formed on the Output Side 54O of Substrate 54.

Finally, FIG. 7D illustrates an embodiment of a Compensator 34C wherein Field Lens 52 and Shaper 54 are again integrated into a single compound, or complex, holographic DOE lens element mounted on Input Side 50I of Substrate 50. In this instance, however, Aperture 56 is formed by a DOE deflection aperture surrounding the Field Lens 52/Shaper 54 element on Input Side 50I. As will be understood by those of skill in the arts, a deflection aperture is functionally an aperture, but operates to deflect away those portions of Input Beam 30I that are outside the range of the Field Lens 56/Shaper 58 element.

D. Remapper 34R

Referring now to FIG. 7E, therein is illustrated an embodiment of a Remapper 28R as may be used in a Compensator/Shaper 34 in conjunction with a Compensator 34C.

As described above, Compensator 34C is illuminated by an Input Beam 38I wherein the components of Input Beam 38I may have different input angles and different lateral displacements, and will form that Input Beam 38I into an evenly distributed, parallel Aligned Beam 38A with which to illuminate Remapper 34R. Aligned Beam 38A may, for example, have a non-round Gaussian profile and Remapper 34R remaps Aligned Beam 38A into an Remapped Beam 38R having an optimum profile, designated as Profile 38RP, which may be, for example, a round Gaussian profile. Remapped Beam 38R is then remapped by Shaper 46 into a Shaped Beam 38S having a Shaped Profile 38SP, such as a flat top profile.

In a presently preferred embodiment, Remapper 34R is a CGH implemented as either a radial symmetric diffractive optical element (RSDOE) or a non-symmetric diffractive optical element (NSDOE) that accepts the evenly distributed, parallel Aligned Beam 38A from Compensator 34C and collimates, converges and remaps the profile of Aligned Beam 38A, which may be a non-round Gaussian profile, to form an Remapped Beam 38R having the desired profile for Shaper 46, such as a round Gaussian profile.

While it will be understood from the above discussions that a Compensator/Remapper 34 of the present invention may be constructed from a number of elements arranged in a number of ways, certain of which have been described above, the presently preferred configuration of a Compensator/Remapper 34 is a two element design having a DOE element following a CGH element. In this two element configuration, the separation between the optics of the two elements is on the order of 50 mm to 1500 mm with an optimum distance in the range of 50 mm and the optimum clear aperture of the Compensator/Remapper 34 is in the order of 04. Mm to 25 mm.

Lastly, the above described optical elements of the present invention are commercially available and may be obtained from or manufactured by, for example, MEMS Optical of Huntsville, Ala., Heptagon of Finland, Suss Micro Optics of Neuchatel, Switzerland, or Digital Optics Corporation of Charlotte, N.C.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A compensator/remapper for control and correction of laser pointing and thermal drift instability in a laser beam delivery system including a laser generating a laser beam and a plurality of optical elements for directing, shaping and focusing the laser beam along a beam path to a target, the compensator/remapper comprising:

a non-symmetric compensator element for receiving an input laser beam having at least one of an angular deviation between an axis of the laser beam and an axis of the compensator element and a radial deviation between the axis of the laser beam and the axis of the compensator element and having beam redirection characteristics for redirecting the input laser beam into a remapper element, the beam redirection characteristics of the non-symmetric compensator element including at least one of an angular redirection of the input laser beam by an angle directly proportional to a radial offset between a point of incidence of the laser beam on an input side of the compensator element and the axis of the compensator element, and an angular redirection of the input laser beam by an angle inversely proportional to an angle of incidence of the input beam with respect to the input side of the non-symmetric compensator element, and a remapper element illuminated by the laser beam from the compensator element and remapping the components of the aligned laser beam into a shaped laser beam having a profile that is optimum for remapping into a flat top laser beam.

2. The compensator/remapper of claim 1, wherein:
the compensator element is computer generated hologrammic lens encoded over an entire surface of the hologrammic lens.

3. The compensator/remapper of claim 1, wherein:
the remapper element is one of a computer generated holographic radially symmetric diffractive optical element (RSDOE) and a computer generated holographic non-symmetric diffractive optical element (NSDOE).

4. The compensator/remapper of claim 1, wherein the compensator element includes:
a substrate,
a field lens located on an input side of the substrate,
a diffractive optical element shaper located on an output side of the substrate, and
an aperture defined by the field lens.

5. The compensator/remapper of claim 1, wherein the compensator element includes:
a compensator element formed of a refractive lens element,
a computer generated holographic diffractive optical element shaper located on an output side of the compensator element, wherein
the refractive lens forms a substrate for the diffractive optical element diffractive optical element shaper, and
the shaper forms an aperture.

6. The compensator/remapper of claim 1, wherein the compensator element includes:

a substrate,
a single diffractive optical element located on an input side of the substrate and forming an integrated field lens element and shaper element, and
an aperture formed on an output side of the substrate.

7. The compensator/remapper of claim 1, wherein:
the aligned laser beam output of the compensator element has a non-round Gaussian profile.

8. The compensator/remapper of claim 1, wherein:
the shaped laser beam output of the remapper element has a round Gaussian profile.

9. The compensator/remapper for control and correction of laser pointing and thermal drift instability in a laser beam delivery system including a laser generating a laser beam and a plurality of optical elements for directing, shaping and focusing the laser beam along a beam path to a target of claim 1, wherein the non-symmetric compensator element includes:

an angular deviation non-symmetric compensator element for receiving an input laser beam having at least one of an angular deviation between an axis of the laser beam and an axis of the compensator element and a radial deviation between the axis of the laser beam and the axis of the compensator element and having a beam redirection characteristic of an angular redirection of the input laser beam by an angle inversely proportional to an angle of incidence of the input beam with respect to an input side of the angular deviation non-symmetric compensator element so that a laser beam exiting an output side of the angular deviation non-symmetric compensation element has an axis parallel to an axis of the angular deviation non-symmetric compensation element, and a lateral deviation non-symmetric compensator element for receiving an input laser beam from the angular deviation non-symmetric compensator element and having a beam redirection characteristic of an angular redirection of the input laser beam by an angle directly proportional to a radial offset between a point of incidence of the laser beam from the angular deviation non-symmetric compensator element on an input side of the lateral deviation non-symmetric compensator element and an axis of the lateral deviation non-symmetric compensator element to redirect an output laser beam from the lateral deviation non-symmetric compensator element to a desired point on an input side of the remapper element.

10. A method for control and correction of laser pointing and thermal drift instability in a laser beam delivery system including a laser generating a laser beam and a plurality of optical elements for directing, shaping and focusing the laser beam along a beam path to a target, comprising the steps of:

receiving an input laser beam having at least one of an angular deviation between an axis of the laser beam and an axis of the compensator element and a radial deviation between the axis of the laser beam and the axis of the compensator element, redirecting the input laser beam by at least one of
an angular redirection of the input laser beam by an angular directly proportional to a radial offset between a point of incidence of the laser beam on an input side of the compensator element and the axis of the compensator element, and
an angular redirection of the input laser beam by an angular inversely proportional to an angle of incidence of the input beam with respect to the input side of the non-symmetric compensator element, and remapping the components of the aligned laser beam into a shaped laser beam having a profile that is optimum for remapping into a flat top laser beam.

11. The method for control and correction of laser pointing and thermal drift instability of claim 10, wherein:
the redirecting of the components of the input laser beam is performed by a computer generated hologrammic lens encoded over an entire surface of the hologrammic lens.

12. The method for control and correction of laser pointing and thermal drift instability of claim 10, wherein:
the remapping of the components of the aligned laser beam is performed by one of a computer generated holographic radially symmetric diffractive optical element (RSDOE) and a computer generated holographic non-symmetric diffractive optical element (NSDOE).

13. The method for control and correction of laser pointing and thermal drift instability of claim 10 wherein the redirecting of the components of the input laser beam is performed by a compensator element including:
a substrate,
a field lens located on an input side of the substrate,
a diffractive optical element shaper located on an output side of the substrate, and
an aperture defined by the field lens.

14. The method for control and correction of laser pointing and thermal drift instability of claim 10 wherein the redirecting of the components of the input laser beam is performed by:
a compensator element formed of a refractive lens element,
a computer generated holographic diffractive optical element shaper located on an output side of the compensator element, wherein
the refractive lens forms a substrate for the diffractive optical element diffractive optical element shaper, and
the shaper forms an aperture.

15. The method for control and correction of laser pointing and thermal drift instability of claim 10 wherein the redirecting of the components of the input laser beam is performed by a compensator element including:
a substrate,
a single diffractive optical element located on an input side of the substrate and forming an integrated field lens element and shaper element, and
an aperture formed on an output side of the substrate.

16. The method for control and correction of laser pointing and thermal drift instability of of claim 10, wherein:
the aligned laser beam has a non-round Gaussian profile.

17. The method for control and correction of laser pointing and thermal drift instability of of claim 10, wherein:
the shaped laser beam has a round Gaussian profile.

18. The method for control and correction of laser pointing and thermal drift instability in a laser beam delivery system including a laser generating a laser beam and a plurality of optical elements for directing, shaping and focusing the laser beam along a beam path to a target of claim 10, wherein the step of redirecting the input laser beam includes the steps of:
redirecting the input laser beam by an angle inversely proportional to an angle of incidence of the input beam with respect to an input side of a first non-symmetric compensator element so that a laser beam exiting an output side of the first non-symmetric compensation element has an axis parallel to an axis of the first non-symmetric compensation element, and
redirecting the laser beam from the first non-symmetric compensator element by an angle directly proportional to a radial offset between a point of incidence of the laser beam from the first non-symmetric compensator element on an input side of a second non-symmetric compensator element and an axis of the second non-symmetric compensator element to redirect the laser beam to a desired point on an input side of a remapper element.

* * * * *